(12) United States Patent
Meier et al.

(10) Patent No.: US 10,843,198 B2
(45) Date of Patent: Nov. 24, 2020

(54) SUPPORT PROFILE FOR LABORATORY AUTOMATION SYSTEM

(71) Applicant: TECAN TRADING AG, Maennedorf (CH)

(72) Inventors: Theo Meier, Hombrechtikon (CH); Martin Kuster, Eschenbach (CH)

(73) Assignee: TECAN TRADING AG, Maennedorf (CH)

( * ) Notice: Subject to any disclaimer, the term of this patent is extended or adjusted under 35 U.S.C. 154(b) by 0 days.

(21) Appl. No.: 16/375,762

(22) Filed: Apr. 4, 2019

(65) Prior Publication Data

US 2019/0308195 A1 Oct. 10, 2019

(30) Foreign Application Priority Data

Apr. 6, 2018 (EP) .................................. 18166035

(51) Int. Cl.

| | |
|---|---|
| *A47B 13/16* | (2006.01) |
| *B01L 9/02* | (2006.01) |
| *F16B 5/02* | (2006.01) |
| *F16B 12/30* | (2006.01) |
| *A47B 13/06* | (2006.01) |
| *A47B 13/00* | (2006.01) |
| *A47B 37/00* | (2006.01) |
| *G01N 35/00* | (2006.01) |
| *F16B 19/02* | (2006.01) |

(Continued)

(52) U.S. Cl.
CPC .............. *B01L 9/02* (2013.01); *A47B 13/003* (2013.01); *A47B 13/06* (2013.01); *A47B 13/16* (2013.01); *F16B 5/025* (2013.01); *F16B 12/30* (2013.01); *A47B 2037/005* (2013.01); *A47B 2200/0012* (2013.01); *A47B 2220/0083* (2013.01); *F16B 5/0614* (2013.01); *F16B 19/02* (2013.01); *G01N 35/0099* (2013.01); *G01N 35/109* (2013.01)

(58) Field of Classification Search
CPC ......... B01L 9/02; A47B 13/003; A47B 13/06; A47B 13/16; A47B 2037/005; A47B 2200/0012; A47B 2200/0083; F16B 5/025; F16B 12/30
USPC .......................................... 312/209; 108/155
See application file for complete search history.

(56) References Cited

U.S. PATENT DOCUMENTS

| | | | | |
|---|---|---|---|---|
| 2,153,259 A | * | 4/1939 | Manning | ............... E04B 1/6137 403/408.1 |
| 2,380,379 A | * | 7/1945 | Attwood | ................ A47B 85/02 248/163.1 |

(Continued)

FOREIGN PATENT DOCUMENTS

| | | |
|---|---|---|
| EP | 0 392 291 A1 | 10/1990 |
| WO | WO 97/26539 A1 | 7/1997 |

*Primary Examiner* — Daniel J Troy
*Assistant Examiner* — Timothy M Ayres
(74) *Attorney, Agent, or Firm* — MH2 Technology Law Group LLP (57) ABSTRACT

A worktable for a laboratory automation system can include a worktop with a level surface and a support profile for supporting the worktop, bent from a metal sheet The support profile can include a facing edge, and an underside of the worktop can lie directly on the facing edge. The support profile can include at least one reception lug. The worktable can include a bolt-shaped fastener for attaching the worktop on the support profile. The bolt-shaped fastener can project through the worktop and be received in the reception lug.

14 Claims, 5 Drawing Sheets

(51) Int. Cl.
*F16B 5/06* (2006.01)
*G01N 35/10* (2006.01)

(56) References Cited

U.S. PATENT DOCUMENTS

| | | | | |
|---|---|---|---|---|
| 2,818,764 A | | 4/1954 | Switzer | |
| 2,993,573 A | * | 7/1961 | Bloedow | E06B 3/9642 403/258 |
| 3,325,692 A | * | 6/1967 | Manetti | H05K 7/12 361/808 |
| 3,521,579 A | * | 7/1970 | Stafford | A47B 13/06 108/64 |
| 3,556,023 A | * | 1/1971 | Marschak | A47B 57/045 108/1 |
| 3,565,502 A | * | 2/1971 | Bracy | A47B 17/003 312/195 |
| 3,572,869 A | * | 3/1971 | Studinski | A47B 13/08 312/194 |
| 3,574,434 A | * | 4/1971 | Propst | A47B 5/00 312/245 |
| 3,580,652 A | * | 5/1971 | Nielsen | A47B 13/003 312/208.1 |
| 3,967,432 A | | 7/1976 | Starr | |
| 4,050,752 A | * | 9/1977 | Dykstra | A47B 9/14 312/243 |
| 4,093,167 A | * | 6/1978 | Rooklyn | A47B 13/021 108/158.11 |
| 4,094,561 A | * | 6/1978 | Wolff | A47B 21/06 138/106 |
| 4,433,884 A | * | 2/1984 | Edwards | A47B 83/001 312/107 |
| 4,444,125 A | * | 4/1984 | Welsch | A47B 13/021 108/155 |
| 4,600,248 A | * | 7/1986 | Pflieger | A47B 17/00 312/195 |
| 4,601,621 A | * | 7/1986 | Permoda | F16B 5/02 411/182 |
| 4,645,171 A | * | 2/1987 | Heide | A47B 13/08 248/637 |
| 4,660,477 A | * | 4/1987 | Kortering | A47B 96/025 108/108 |
| 4,727,816 A | * | 3/1988 | Virtue | A47B 3/0912 108/155 |
| 5,024,167 A | * | 6/1991 | Hayward | A47B 17/003 108/50.02 |
| 5,372,342 A | * | 12/1994 | Adams | A47B 13/06 248/150 |
| 5,394,809 A | * | 3/1995 | Feldpausch | A47B 9/00 108/147.21 |
| 5,443,791 A | * | 8/1995 | Cathcart | B01L 3/50825 422/561 |
| 5,558,920 A | * | 9/1996 | Heide | A47B 37/00 248/637 |
| 5,674,023 A | * | 10/1997 | Williams | F16B 2/065 174/158 R |
| 5,934,203 A | * | 8/1999 | Glass | A47B 13/003 108/156 |
| 6,240,984 B1 | * | 6/2001 | Fawcett | G01N 1/405 141/129 |
| 6,397,550 B1 | * | 6/2002 | Walker | E04O 3/07 52/481.1 |
| 6,682,030 B2 | * | 1/2004 | Santoro | A47B 9/04 108/147 |
| 7,066,097 B2 | * | 6/2006 | Gayhart | A47B 21/06 108/50.02 |
| 8,034,194 B2 | * | 10/2011 | Ikushima | B05B 13/00 134/166 R |
| 8,056,303 B2 | * | 11/2011 | Frobosilo | E04C 3/09 52/831 |
| 8,276,523 B2 | * | 10/2012 | Miller | A47B 21/00 108/50.02 |
| 9,578,959 B2 | * | 2/2017 | Isgr | F16B 1/00 |
| 10,315,303 B2 | * | 6/2019 | Kidd | B25H 1/02 |
| 2006/0211080 A1 | * | 9/2006 | Frost, III | B01F 13/0052 435/30 |
| 2014/0193826 A1 | * | 7/2014 | Gajewski | G01N 35/028 435/6.12 |
| 2017/0087673 A1 | | 3/2017 | Tsui | |
| 2017/0299619 A1 | * | 10/2017 | Zucchelli | G01N 35/02 |

\* cited by examiner

SUPPORT PROFILE FOR LABORATORY AUTOMATION SYSTEM

CROSS REFERENCE

This application claims priority to European Patent Application No. 18166035.8, filed Apr. 6, 2018, the disclosure of which is herein incorporated by reference in its entirety.

FIELD

The invention relates to a worktable for a laboratory automation system as well as a laboratory automation system with a worktable.

BACKGROUND

Laboratory automation systems are used for automating the activities of a laboratory assistant. Samples may for example be pipetted with a laboratory automation system, mixed with chemicals and the subsequent reactions analyzed.

Freely configurable laboratory automation systems may also have a worktable, on which a plurality of components may be fixed for the laboratory automation system, such as for example containers for samples, containers for pipetting tips, containers for chemicals, pipetting plates and/or analysis apparatus. A pipetting arm that may be moved in several dimensions is normally attached to the worktable, which may for example receive disposable pipetting tips and pipette samples or chemicals into receptacles of a pipetting plate.

A worktable for a laboratory automation system normally has a worktop, on which the above mentioned components are fixed, and a frame that stabilizes the worktop and on which the pipetting arm may be fixed. As the pipetting arm or the outer end of a pipetting tip may have to be positioned very precisely under certain circumstances it may be necessary that the worktop is almost level, for example with a deviation of less than a few ¹/₁₀ mm.

Profile sections or angled sheet metal sections are normally used for constructing the frame. The worktop is then mounted on the side surfaces of these sections or sheet metal sections. Any unevenness on these side surfaces, which may be caused by the manufacturing processes of the profile section or during the sheet metal bending processes, may contribute towards an unevenness of the worktop, which must then be compensated for with complex post-processing.

SUMMARY

It is the objective of the invention to provide a worktable for a laboratory automation system, which has the most level worktop possible and is easy and cheap to manufacture.

This objective is solved by the subject-matter of the independent claims. Further embodiments of the invention result from the dependent claims and from the following description.

One aspect of the invention relates to a worktable for a laboratory automation system. A laboratory automation system may be an apparatus that is designed for automating pipetting processes. For this the laboratory automation system may provide a level surface (e.g., a flat surface) with the worktable on which components such as containers and/or analysis apparatus may be placed. The laboratory automation system may further have a pipetting arm, which may for example be provided by the worktable and/or with which the pipetting processes are carried out. The laboratory automation system may also comprise a control unit for controlling the pipetting arm.

According to one embodiment of the invention, the worktable comprises a worktop with a level surface, a support profile for supporting the worktop that is bent from sheet metal, wherein the support profile has a facing edge or side edge and an underside of the worktop lies directly on the facing edge. The support profile further has at least one reception lug. A bolt-shaped fastener for attaching the worktop to the support profile projects through the worktop and is received in the reception lug.

The worktop may be made of metal, such as for example steel or aluminum. A level surface may be a surface that has only unevennesses of less than 0.5 mm, or deviates less than 0.5 mm from a mathematical plane.

The support profile may also be made of metal, in particular of sheet metal or sheet steel. Assuming a non-bent metal sheet the support profile may be formed through bending and/or cutting the metal sheet. A facing edge of the metal sheet or the support profile is used to support the worktop. The facing edge may here be in direct contact with the underside, i.e. the side opposite the surface or the top.

In general a metal sheet has two opposite side surfaces and circumferential facing edges. The facing edge of the metal sheet or the support profile may therefore be as wide as the metal sheet is thick. The facing edge of the metal sheet or the support profile may be formed through cutting the metal sheet and/or may be a cut surface.

The fastener may be inserted through a hole in the worktop that lies opposite the reception lug. The fastener may have a head that holds the worktop and a foot that is anchored in the reception lug.

The fact that the worktop is attached on the facing edge of the support profile may reduce manufacturing tolerances, as a metal sheet cutting process that forms the facing edge may have lower manufacturing tolerances than a bending process with which a connection flange could for example be formed. This may reduce the tolerance with regard to unevennesses of the worktable that comes to lie directly on the facing edge, to the process accuracy of the selected metal sheet cutting process. The influence of other processes, such as for example a bending process, may also be lessened. A metal sheet cutting process, such as laser cutting and/or punching, may have a manufacturing tolerance of less than 0.1 mm, whilst metal sheet bending processes using folding machines may have manufacturing tolerances of more than 0.1 mm.

According to one embodiment of the invention, the reception lug extends along a section or leg of the support profile that provides the facing edge. The reception lug may extend parallel to the direction of extension of the section of the support profile that provides the facing edge. An axis of the reception lug may also extend on the level of this section and/or orthogonal to the worktop. In other words the reception lug extends along the side surface of the support profiles. The axis of the reception lug may extend through a line defined by the facing edge along the underside of the worktop.

The fastener or a foot of the fastener may extend through the facing edge or through a line defined by the facing edge along the underside of the worktop.

According to one embodiment of the invention, the reception lug is formed from upwardly bent sheet metal strips of the support profile. The reception lug may be formed in that the metal sheet of the support profile is cut in at various distances substantially parallel towards the facing edge and the resulting sheet metal strips or sheet metal elements are bent upwards. The upwardly bent sheet metal strips may be alternately bent away from the support profile in two opposing directions. The sheet metal strips may enclose the fastener or its foot from two sides.

According to one embodiment of the invention, the reception lug is provided by an insert attached to the support profile. An opening may be cut into the support profile, into which the insert, which may be made of plastic, is inserted. The insert may for example have two opposing grooves in which the opposing sides of the opening are received. The reception lug provided by the insert may have an inner thread.

According to one embodiment of the invention, the fastener has a thread, which engages the reception lug. The fastener may be a screw, which is for example screwed through the worktop into the reception lug, and/or may have a foot that provides the thread. It is however also possible that the bolt-shaped fastener is a rivet, which is anchored in the reception lug in some other way.

According to one embodiment of the invention, the support profile is bent to a U-shape and has a first leg and a second leg. The support profile may generally be shaped in such a way that it reinforces itself. This may for example be realized with a U-shaped cross-section of the support profile.

According to one embodiment of the invention, the first leg of the support profile provides the facing edge that is connected with the worktop. The first leg may have a substantially level profile section, which supports the facing edge at an upper end and/or extends in the direction of the worktop.

According to one embodiment of the invention, a second leg of the support profile extends in the direction of the worktop. An air gap may be present between the second leg and the worktop. The second leg does therefore not need to touch the worktop. The second leg may have a substantially level profile section that extends in the direction of the worktop. Contrary to the first leg the second leg does however not need to touch the worktop.

According to one embodiment of the invention, the second leg is bent at the end of the first leg that faces in the direction of the worktop, so that the air gap is formed between a side surface of the support profiles and the worktop. The facing edge on the second leg may therefore face in the direction of the first leg.

According to one embodiment of the invention, the support profile has a floor section that extends transverse to the first leg and the second leg between the first leg and the second leg. Overall the support profile may have four sections in cross-section, which form an open polygon, for example a square or a pentagon.

According to one embodiment of the invention, the floor section has holes through which the bolts extend, to which feet for positioning the worktable are attached. The worktable may for example be positioned on a substructure of the laboratory automation system.

According to one embodiment of the invention, the facing edge is straightened by means of a metal sheet cutting process. The facing edge may for example be straightened by means of a laser cutting process or a punching process. In this way a manufacturing tolerance of less than 0.1 mm may be realized for the facing edge.

According to one embodiment of the invention, the worktable has two support profiles extending in parallel, which are each attached on the worktop with a facing edge or with just one facing edge. The two support profiles may be attached to two side frames, which form a rectangular frame together with the support profiles when viewed from above, on which the worktop is supported.

According to one embodiment of the invention, the worktop has holes, wherein holders for components of the laboratory automation systems are inserted into the holes. The holders may for example be made of plastic. The holders may have a head that projects further than the surface of the worktop and/or may have a foot that is designed for arresting the corresponding hole. A component of the laboratory automation system may be a container for disposable pipetting tips, a container for samples, a container for chemicals, a pipetting plate and/or an analysis apparatus. The component may have a recess on its underside, which is designed to be anchored on the head of the holder.

According to one embodiment of the invention, holes for holders are arranged between the facing edge and a second leg of the support profile. The holes may be arranged in such a way that they lead into an interior of the support profile.

According to one embodiment of the invention, the worktable further comprises two side frames extending in parallel towards which the support profile runs in an orthogonal direction and to which the support profile is attached with its ends. The support profile may for example be inserted into openings in the side frame.

According to one embodiment of the invention, the worktable further comprises a rail for attaching a pipetting arm, for example for carrying a pipetting tip. This rail may be arranged above the worktop. The rail may comprise a rail profile bent from a metal sheet and attached to two side frames of the worktable with its ends.

According to one embodiment of the invention, the rail profile has a rectangular cross-section. The metal sheet of the rail profile may be bent to form a rectangular cross-section. In this way the rail may also be designed to be stable and light.

A further aspect of the invention relates to a laboratory automation system that comprises a worktable like the one described above and below. The laboratory automation system may further have a pipetting arm together with its actuators (such as a pump, motors for moving the arms etc.) and optionally an associated controller.

BRIEF DESCRIPTION OF THE FIGURES

Embodiment examples of the invention will be described in detail as follows with reference to the enclosed Figures. In the figures.

The reference numbers used in the Figures and their meaning are listed in summary form in the list of reference numbers. In principle identical or similar parts are identified with the same reference numbers.

DETAILED DESCRIPTION

Figure 1:
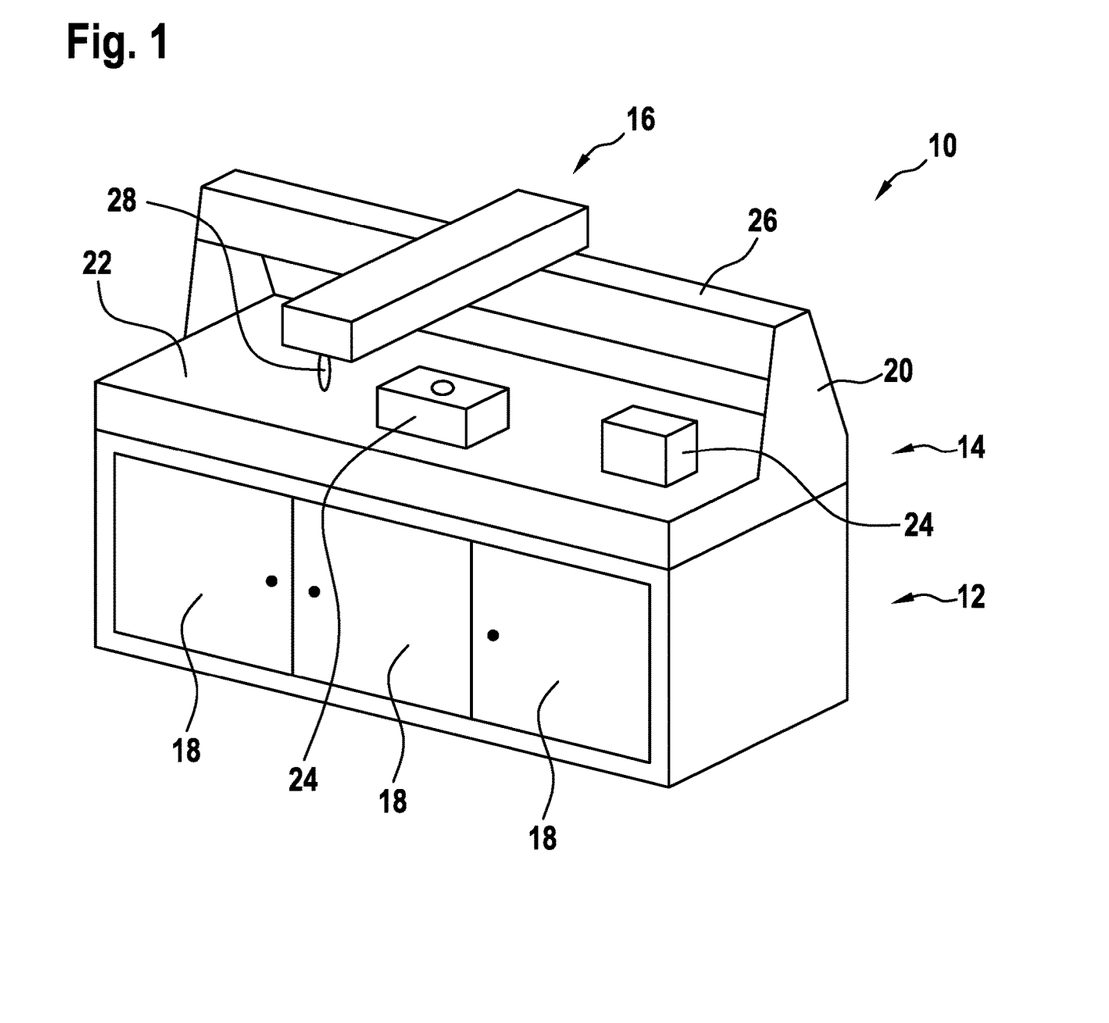
FIG. 1 shows a schematic perspective view of a laboratory automation system according to an embodiment of the invention.

FIG. 1 shows a laboratory automation system 10, comprising a substructure 12, a worktable 14 positioned on the substructure 12 and a pipetting arm 16 attached to the worktable 14.

The substructure 12 may comprise one or more cupboards 18 and/or may hold the worktable 14 at one height, so that an operator may comfortably access the worktable 14.

The worktable 14 has a frame 20, on which a worktop 22 is attached, on which several components of the laboratory automation systems 10 may in turn be attached or anchored. These components 24 may be containers for disposable pipetting tips, containers for samples, containers for chemicals, pipetting plates and/or analysis apparatus.

The worktable 14 further has a rail 26, which is arranged above the worktop 22 and extends parallel to the worktop. The pipetting arm 16 is moveably mounted on this rail 26. The pipetting arm may be moved along the rail 26 with the aid of one or more motors and/or a pipetting tip 28 supported by the pipetting arm 16 may be moved in three dimensions across the worktop 22. Fluids may be aspirated and dispensed from a container or components 24 with the pipetting tip 28 with a pump integrated in the laboratory automation system 10.

Figure 2:
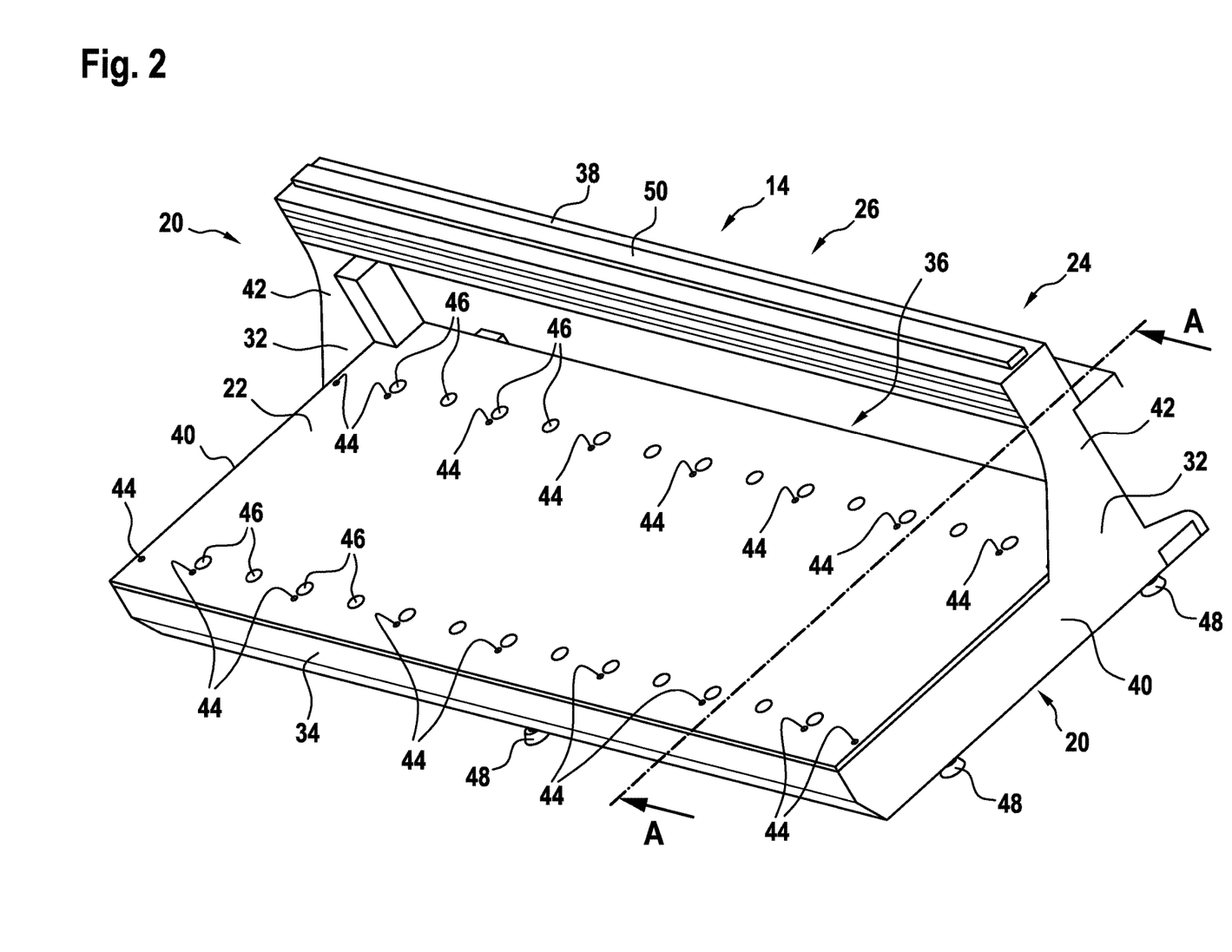
FIG. 2 shows a perspective view of a worktable according to an embodiment of the invention.

FIG. 2 shows the worktable 14 in more detail. The frame 20 is made up of two side frames 32 arranged parallel with each other, two support profiles 34 and 36 extending in parallel (see also FIG. 3) and a rail profile 38. The profiles 34, 36 and 38 are connected with the side frame 32 with their ends. A slot may for example be present in the side frames 32 for each profile 34, 36, 38, into which a tab of the respective profile 34, 36, 38 is inserted and/or clamped. The profile 34, 36, 38 may further be welded to the side frames 32 with the side frames.

The rail profile 38 extends parallel to the support profiles 34, 36 and is arranged above the same. For this, each one of the side frames 32 is L-shaped. The support profiles 34, 36 are attached at one height to a horizontal leg 40 of the side frames 32. The rail profile 38 is attached above these on a vertical leg 42 of the side frames 32.

The worktop 22 is laid onto the support profiles 34, 36 between the side frames 32 and connected with the same via bolt-shaped fasteners 44 in the form of screws. The fasteners 44 are arranged in a row for each support profile 34. In addition to these rows two rows of holders 46 extend along the same, on which components 24 of the laboratory automation systems 10 may be anchored.

Feet 48 are attached on the underside of each support profile 34, 36, with which the worktable 14 may be positioned on the substructure. A plastic rail or a linear guide 50 is attached on the rail profile 38 of the rail 26 and serves for guiding the pipetting arm 16.

Figure 3:
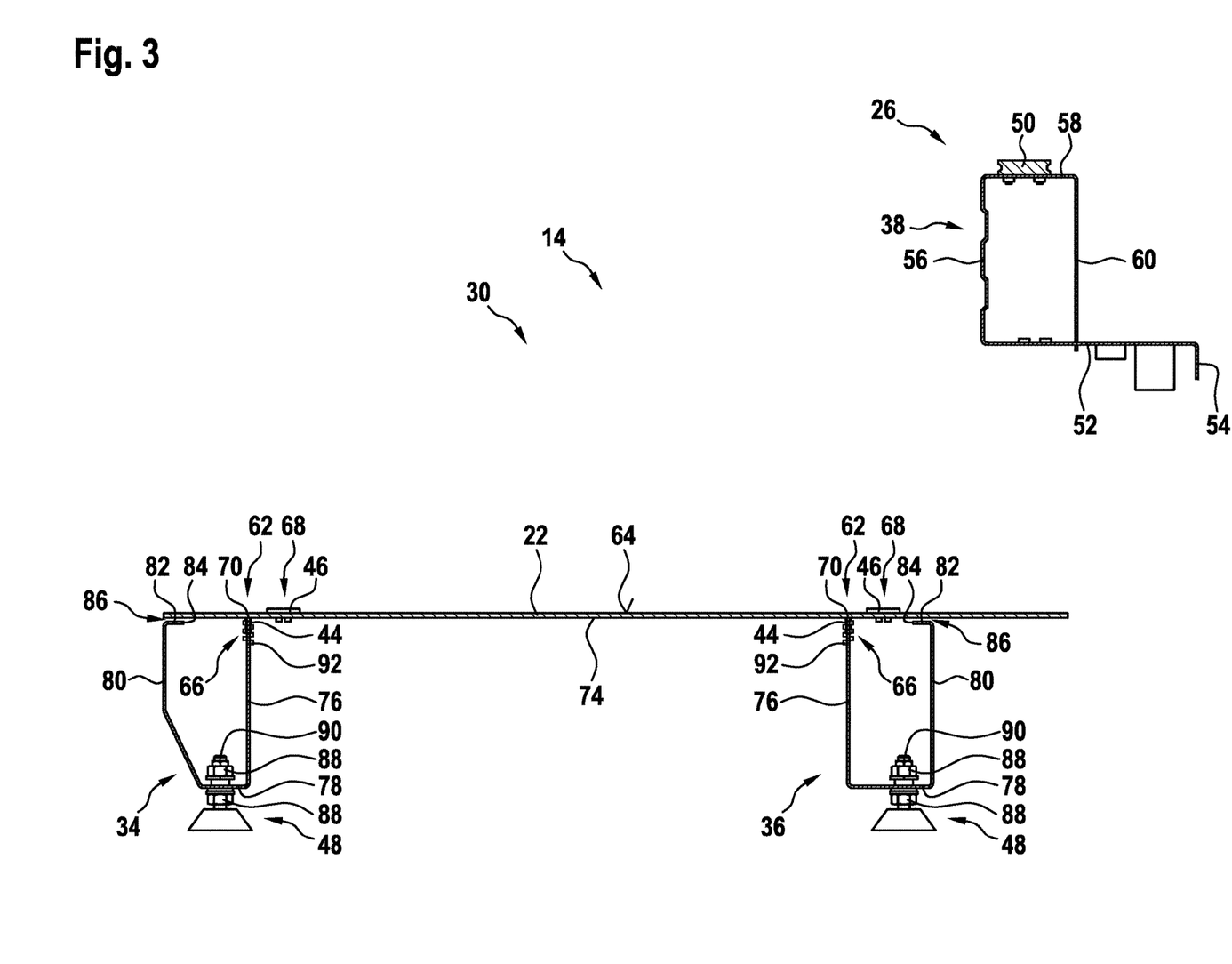
FIG. 3 shows a cross-section through the worktable of FIG. 2.

FIG. 3 shows a cross-section through the worktable 14 along a plane that is vertical to line A-A in FIG. 2. The rail profile 38 of the rail 26 is bent from a metal sheet to produce a rectangular cross-section. A horizontal floor section 52 of the rail profile 38 has a folded end 54 pointing downward. At the opposite end the floor section 52 transforms into a first vertical wall section 56, which in turn transforms into a horizontal ceiling section 58. The plastic rail 50 is attached to the ceiling section 58. The ceiling section 58 transforms into a second vertical wall section 60, which is supported on the floor section 52 with its facing edge and/or inserted into the same.

The worktop 22 has first holes 62, through which the fasteners 44 are inserted. The fasteners 44 may have a countersunk head that is substantially level with the surface 64 of the worktop 22 and/or is recessed into the same. A foot of the fasteners 44 is anchored in a reception lug 66 provided by each of the respective support profiles 34, 36.

The worktop 22 further has second holes 68, into which the holders 46 are inserted. The holders 46 may be made of plastic and have a head that projects further than the surface 64 and may be anchored in the components 24 (see FIG. 1). A foot of the holders 46 may be held in the respective hole 68 by means of an undercut.

Like the rail profile 38, the two support profiles 34, 36 are each made from a bent metal sheet.

Figure 4:
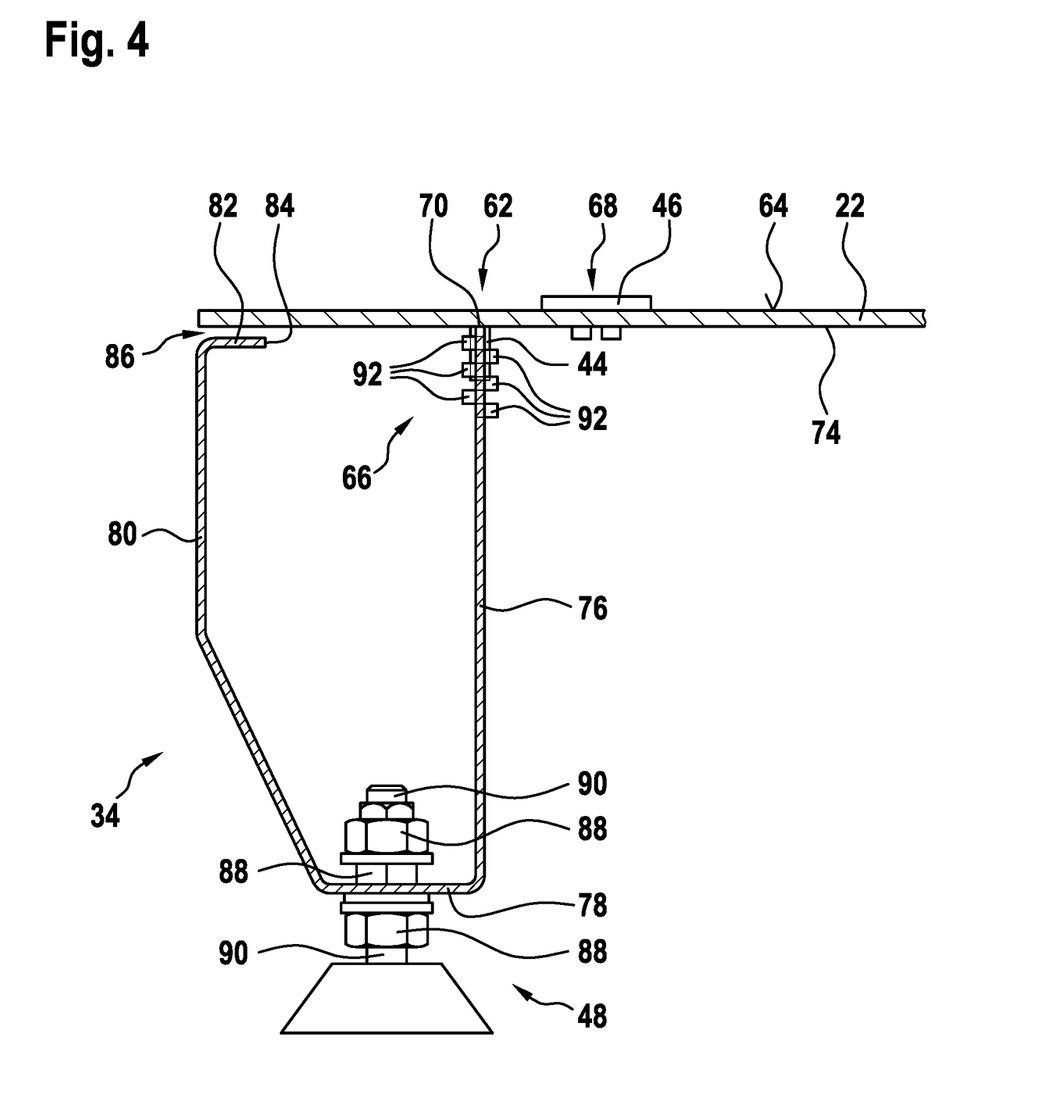
FIG. 4 shows a section of FIG. 3.

As may also be seen in FIG. 4, which shows a cross-section of the support profile 34 analogous to that of FIG. 3, the worktop 22 lies on a facing edge 70 of the support profile 34, 36. The facing edge 70 is in direct contact with the underside 74 of the worktop 22. The fastener 44 may here press the facing edge 70 against the underside 74 of the worktop 22.

The support profiles 34, 36 are bent into a U-shape. The facing edge 70, which constitutes a cutting edge or cut surface of the metal sheet of which the respective support profile 34, 36 is made, is provided at an upper end of a first leg 76 of the respective support profile 34, 36. The first leg 76 is arranged substantially vertical and/or also provide the reception lug 66 at the upper end.

The first leg 76 transforms into a floor section 78 at the lower end, which is oriented horizontally. The floor section 78 transforms into a second leg 80 extending back in the direction of the underside 74 of the worktop 22. The second leg 80 of the support profile 36 here extends substantially vertically. The second leg 80 of the support profile 36 comprises two sections, wherein an upper section extends vertically and a lower section runs diagonal to this direction.

The second leg 80 has an end section 82 at the upper end, which is bent in the direction of the first leg 76, so that a further facing edge 84 of the support profile 34, 36 faces in the direction of the first leg 76. The end section 82 extends substantially parallel to the underside 74 of the worktop 22, wherein it does however not touch the worktop 22. An air gap 86 is formed between the second leg 80 or its end section 82 and the worktop 22.

It may also be seen in FIG. 3 that the holders 46 are arranged next to the support profile 34, i.e. outside of the legs 76, 80. The holders 46 are arranged above the support profile 36, i.e. between the legs 76, 80.

The feet 48 of the worktable 14 are attached to the floor sections 78 of the support profiles 34, 36. For this the respective floor section 78 may have a hole through which a bolt 90 of the foot 48 is inserted and screwed tight by means of one or more nuts 88.

FIGS. 3 and 4 show that the axis of the reception lug 66 extends parallel to the extension direction of the metal sheet or of the first leg 76 of the support profile 34, 36. The fastener 44 is arranged in the center in relation to the metal sheet or the first leg 76.

In FIGS. 3 and 4 the reception lug 66 is formed from sheet metal strips 92 bent away from the axis of the reception lug 66 and/or an extension level of the support profile 34, 36.

Figure 5:
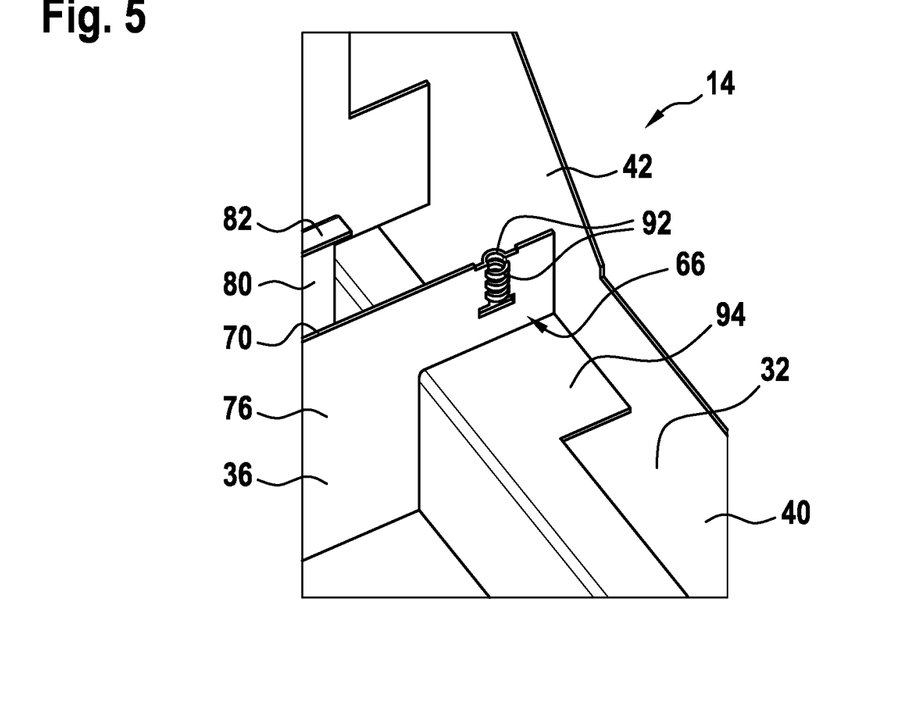
FIG. 5 shows a perspective part view of a worktable according to a further embodiment of the invention.

A section of an embodiment of a worktable 14 is shown in FIG. 5, where the reception lug 66 is also formed from upwardly bent sheet metal strips 92. Such a reception lug 66 may for example be produced with a pliers tool that simultaneously cuts the slots between the sheet metal strips 92 and bends the sheet metal strips 92.

It may be seen in FIG. 5 that the sheet metal strip 92 lying nearest to the underside 74 of the worktop 22 may lie at a distance from this underside 74. It is further shown that the worktable may have further struts 94 for stabilization in addition to the side frames 32 and the profiles 34, 36, which may extend through a slot into the profile 36.

Figure 6:
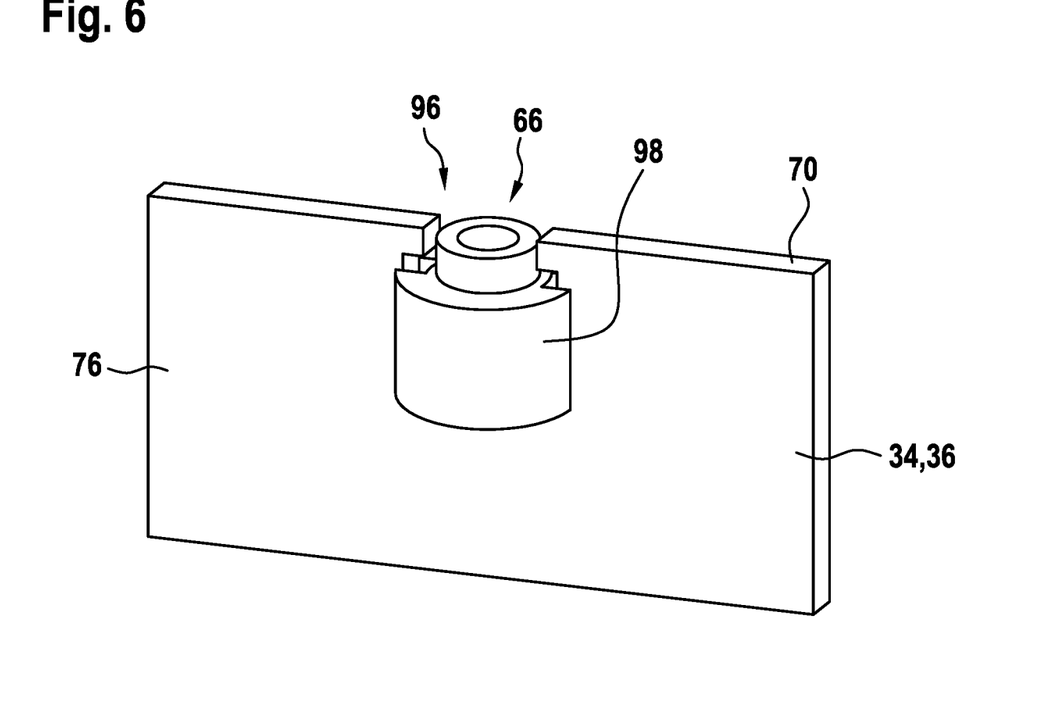
FIG. 6 shows a perspective part view of a support profile for a worktable according to a further embodiment of the invention.

FIG. 6 shows a further embodiment of a reception lug 66, where an opening 96 with two parallel sides is formed in the support profile on the facing edge 70, into which an insert 98 is pushed. The insert 98 may have two parallel grooves, into which the sides of the opening are received and which then prevent the insert 98 from rotating. The insert 98 may be made of plastic and/or provide a reception lug 66, the axis of which extends parallel to an extension direction of the metal sheet of the support profile 34, 36.

In addition it should be mentioned that "comprising" does not rule out other elements or steps, and that "a" or "an" does not rule out a multitude. It should further be noted that features or steps described with reference to the above embodiment examples may also be used in combination with other features or steps of other embodiments examples described above. Reference numbers in the claims should not be seen as a limitation.

The invention claimed is:

1. A worktable for a laboratory automation system, the worktable comprising:
   a worktop with a flat surface; and
   a support profile for supporting the worktop, the support profile comprising a bent metal sheet,
   wherein:
      the support profile has a facing edge;
      an underside of the worktop lies directly on the facing edge;
      the support profile has at least one reception lug;
      a bolt-shaped fastener for attaching the worktop on the support profile projects through the worktop and is received in the reception lug;
      the support profile comprises a U-shape and has a first leg and a second leg;
      the first leg of the support profile provides the facing edge that is connected with the worktop;
      the second leg of the support profile extends in a direction towards the worktop;
      the second leg and the worktop define an air gap therebetween;
      the second leg comprises an end section at an upper end of the second leg;
      the end section of the second leg is bent toward the first leg;
      the end section of the second leg extends substantially parallel to an underside of the worktop;
      the end section of the second leg does not touch the worktop;
      the air gap is disposed between the end section of the second leg and the worktop;
      the support profile has a floor section between the first leg and the second leg;
      the floor section has holes through which bolts extend, at on which feet for positioning the worktables are attached; and
      the support profile with the first leg, the floor section and the second leg with its end section forms an open polygon in cross section; and
      the air gap is free from any portion of the support profile.

2. The worktable according to claim 1, wherein the reception lug extends along a section of the support profile that provides the facing edge.

3. The worktable according to claim 1, wherein:
   the reception lug comprises upwardly extending sheet metal strips of the support profile; or
   the reception lug is provided by an insert attached on the support profile.

4. The worktable according to claim 1, wherein the fastener has a thread that engages the reception lug.

5. The worktable according to claim 1, wherein the second leg extends in the direction of the first leg at the end facing towards the worktop, so that the air gap is provided between a side surface of the support profile and the worktop.

6. The worktable according to claim 1, wherein:
   the floor section between the first leg and the second leg extends transverse to the first leg and the second leg.

7. The worktable according to claim 1, wherein:
   the facing edge is a straight metal sheet cut facing edge; and/or
   the facing edge is a straight laser cut facing edge.

8. The worktable according to claim 1, wherein the worktable has two support profiles extending in parallel, which are each attached on the worktop with a facing edge.

9. The worktable according to claim 1, wherein:
   the worktop has holes; and
   holders for components of the laboratory automation systems are inserted into the holes.

10. The worktable according to claim 1, wherein:
    the worktable further comprises holes therein configured to receive holders; and
    the holes are arranged between the facing edge and a second leg of the support profile.

11. The worktable according to claim 1, further comprising two side frames extending in parallel, towards which the support profile extends in an orthogonal direction and to which the support profile is attached with its ends.

12. The worktable according to claim 1, further comprising a rail for attaching a pipetting arm, wherein the rail comprises a rail profile comprising a bent metal sheet and is attached to two side arms of the worktable with its ends.

13. The worktable according to claim 12, wherein the rail profile of the rail has a rectangular cross-section.

14. A laboratory automation system, comprising a worktable, the worktable comprising:
    a worktop with a flat surface; and
    a support profile for supporting the worktop, the support profile comprising a bent metal sheet,
    wherein:
       the support profile has a facing edge;
       an underside of the worktop lies directly on the facing edge;
       the support profile has at least one reception lug;
       a bolt-shaped fastener for attaching the worktop on the support profile projects through the worktop and is received in the reception lug;
       the support profile comprises a U-shape and has a first leg and a second leg;
       the first leg of the support profile provides the facing edge that is connected with the worktop;
       the second leg of the support profile extends in a direction towards the worktop;
       the second leg and the worktop define an air gap therebetween;
       the second leg comprises an end section at an upper end of the second leg;
       the end section of the second leg is bent toward the first leg;
       the end section of the second leg extends substantially parallel to an underside of the worktop;

the end section of the second leg does not touch the worktop;

the air gap is disposed between the end section of the second leg and the worktop;

the support profile has a floor section between the first leg and the second leg;

the floor section has holes through which bolts extend, at on which feet for positioning the worktables are attached; and the support profile with the first leg, the floor section and the second leg with its end section forms an open polygon in cross section; and the air gap is free from any portion of the support profile.

\* \* \* \* \*